UNITED STATES PATENT OFFICE.

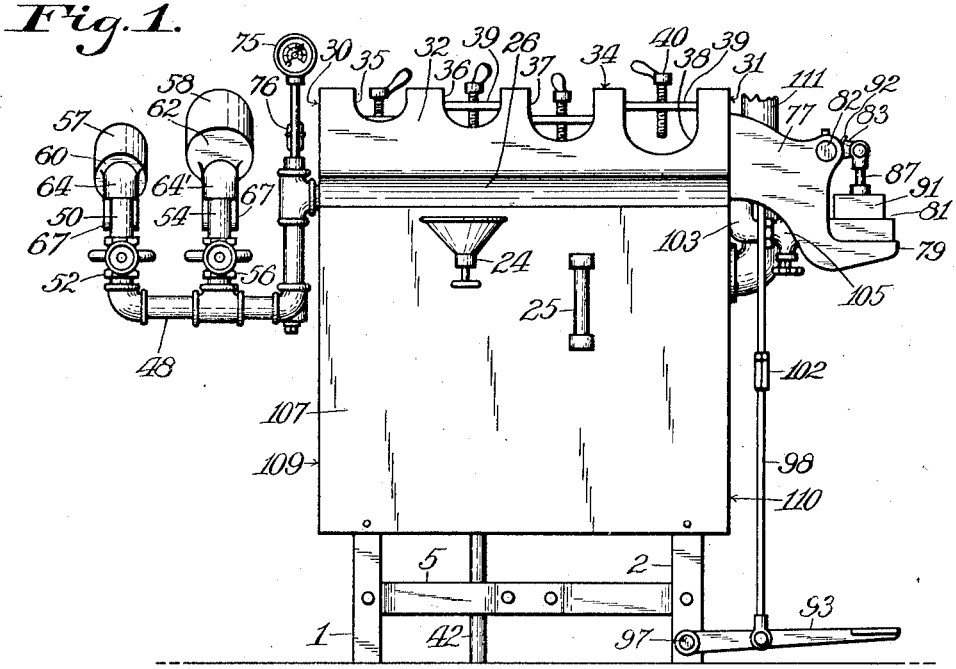
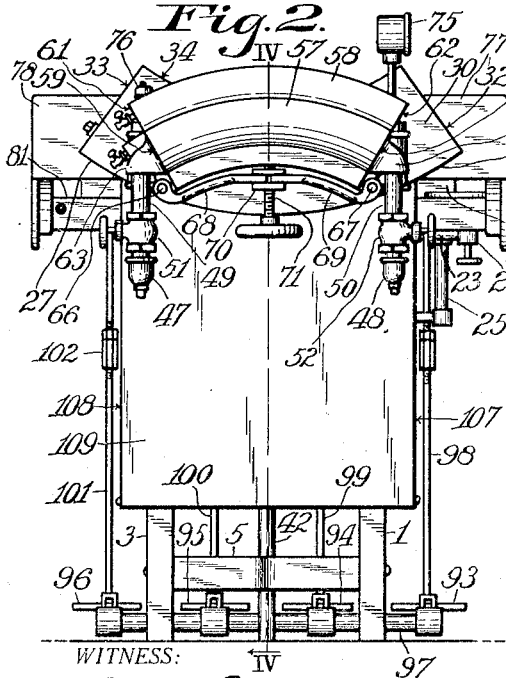
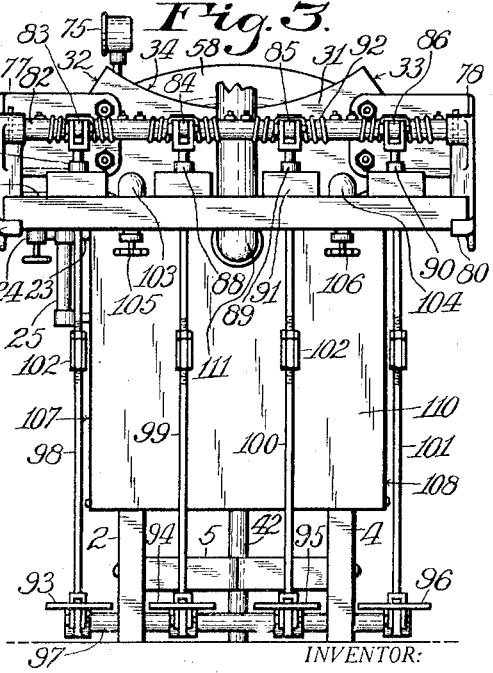

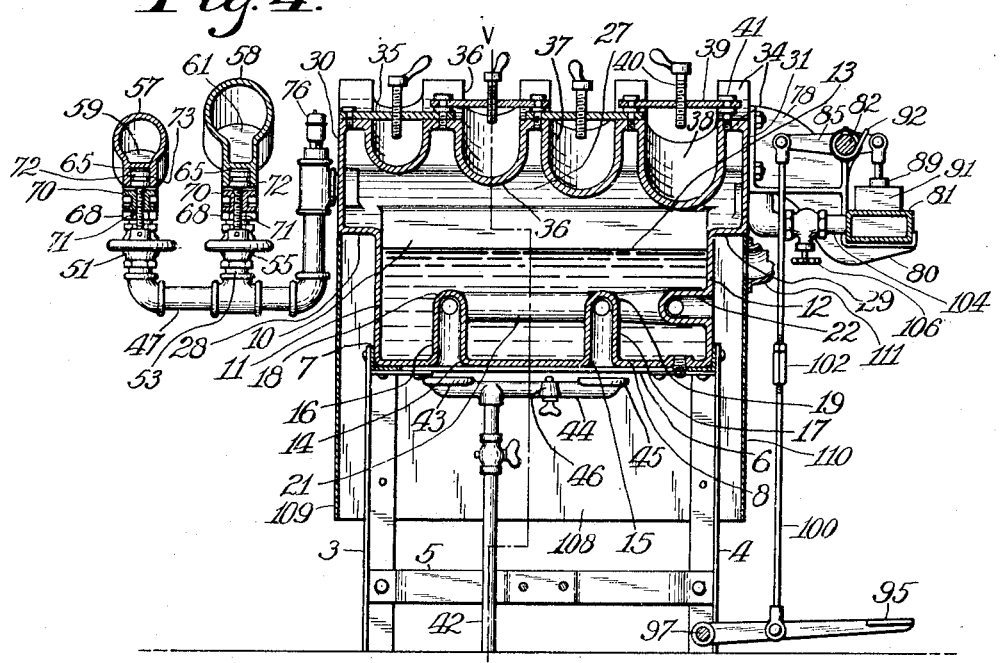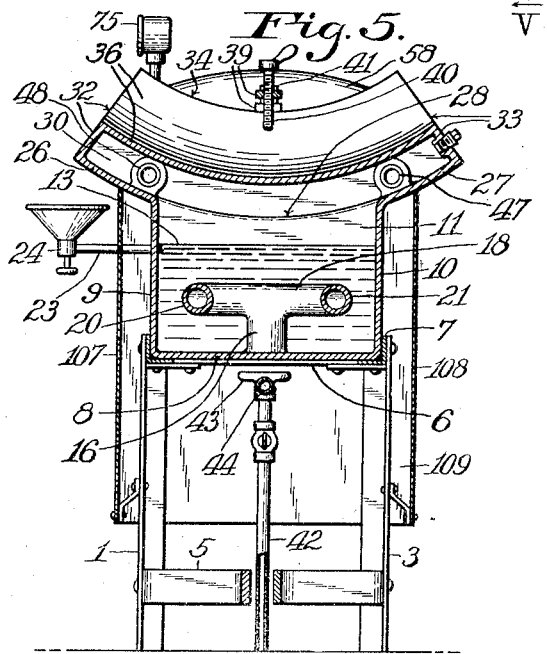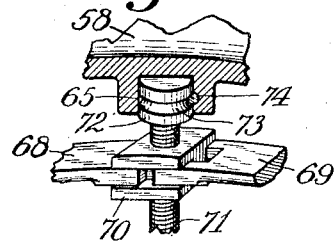

PHILIP DEUTSCHER, OF INDIANAPOLIS, INDIANA.

VULCANIZING APPARATUS.

1,331,982.  Specification of Letters Patent.  Patented Feb. 24, 1920.

Application filed January 9, 1919. Serial No. 270,361.

*To all whom it may concern:*

Be it known that I, PHILIP DEUTSCHER, a citizen of the United States, residing at Indianapolis, in the county of Marion and State of Indiana, have invented a new and useful Vulcanizing Apparatus, of which the following is a specification, reference being had to the accompanying drawings and to the letters and figures of reference marked thereon.

This invention relates to an apparatus which is designed as repair shop equipment, to be used for various vulcanizing operations to repair damaged or worn tires or tire casings having rubber or rubber composition in their structure, the invention having reference more particularly to a complete vulcanizing apparatus whereby vulcanizing of convex portions and concave portions of tire casings and also vulcanizing of inner tubes may be done at one and the same time.

An object of the invention is to provide a vulcanizing apparatus which shall be so constructed as to conveniently and economically combine various types or patterns of contour forms in close association and with a steam-boiler, to insure economical and prompt heating of the contour forms by means of steam, an object being to provide an improved steam-boiler and vulcanizer forms combined which shall be adapted to be economically operated.

Another object is to provide an improved convex contour form and means for securing a tire casing thereto in order to vulcanize the inner side of the casing.

A further object is to provide an improved hollow flat table on which to vulcanize inner tubes, and improved means for securing the tubes to the table to be vulcanized.

A still further object is to improve generally the construction of vulcanizing apparatus with the end in view of effecting economy in the use of fuel for generating steam, and in the saving of time and labor in the operation of the apparatus.

With the above-mentioned and other objects in view, the invention consists in an improved steam-boiler, and a plurality of different steam heated vulcanizer molds having close and practically direct connection with the steam-boiler to quickly receive steam in such condition as to insure satisfactory and economical results; and, the invention consists also further in various improved structures, and in the parts and combinations and arrangements of parts, as hereinafter particularly described and further defined in the accompanying claims.

Referring to the drawings,—Figure 1 is a side elevation of the improved vulcanizing apparatus as preferably constructed; Fig. 2 is an elevation of one end of the apparatus; Fig. 3 is an elevation of the opposite end of the apparatus; Fig. 4 is a section on the line IV—IV in Fig. 2; Fig. 5 is a section approximately on the line V—V in Fig. 4; Fig. 6 is a fragmentary perspective view showing details of the invention on an enlarged scale; and, Fig. 7 is a fragmentary perspective view of details of the improved structure.

In the various figures of the drawings like characters of reference indicate corresponding elements or features of construction herein referred to in detail.

As preferably constructed an improved steam-boiler and tire tread mold combined as a unitary structure is provided and comprises a suitable stand which preferably has separate legs 1, 2, 3 and 4 provided with a tie brace 5, an open rectangular seat frame 6 being secured to the upper portion of the legs and having an upright flange 7 thereon. The steam-boiler portion of the structure comprises a flat bottom 8 arranged upon the seat frame 6, the bottom and the frame preferably being oblong in plan, side wall portions 9 and 10 and main end wall portions 11 and 12 on the bottom 8, being adapted to hold water 13 to be converted into steam. The bottom 8 has a number of holes 14 and 15 therein from which extend vertical main flues 16 and 17 respectively. Transverse flues 18 and 19 are connected to the vertical flues respectively. Longitudinal flues 20 and 21 are connected to the opposite ends respectively of the transverse flues and are connected with an outlet flue 22 that extends through a vertical wall portion of the steam-boiler, so as to conduct heat through the body of the water in the steam-boiler. The water is supplied through a supply-pipe 23 having a valve 24, and the water-level is ascertained by means of a water-gage 25. The longer side wall portions 9 and 10 have lateral extensions 26 and 27 respectively that constitute the bottoms of steam-chamber branches, and the shorter wall portions 11 and 12 have lateral extensions 28 and 29 respectively on which are end walls 30 and 31 respectively that are connected with the extensions 26 and 27, other ends 32 and 33 and a top 34 completing the main steam-chamber and the branches thereof. The top 34 of the steam-boiler is curved so as to have a concave upper face and it has circumferentially-extending grooves or transversely curved portions adapted to constitute tire tread molds or forms 35, 36, 37 and 38, of different sizes transversely, each mold being of suitable length, preferably being approximately a quarter segment of a circle in which small damaged portions of tires or tire casings may be repaired. The top 34 is provided with clamping devices, such as clamp bars 39 provided with clamp screws 40, the clamp bars being slotted to be removably connected to studs 41 secured to the top 34, the studs preferably having collars under which the clamp bars are arranged. Well known devices are to be used as is customary between the clamp screws and the tire or tire casing.

A supply pipe 42 for gas fuel is extended under the steam-boiler and has a gas burner 43 connected thereto that is arranged under the bottom 8 so as to be below the opening 14. The supply pipe has a branch 44 to which another gas burner 45 is connected and arranged below the opening 15, the branch pipe being provided with a stop cock 46.

Two steam-pipes 47 and 48 are connected to the boiler wall portion 30 and are adapted to constitute hollow supporting brackets having communication with the steam space in the steam-boiler, the steam-pipes having vertical terminal portions 49 and 50 and provided with valves 51 and 52 respectively. The steam-pipes or hollow brackets have also vertical branches 53 and 54 respectively that are provided with valves 55 and 56, respectively. Two hollow contour-molds or forms 57 and 58 are provided which differ in dimensions transversely, the larger one being arranged between the steam-boiler and the smaller one of the contour-molds. The contour-molds are convex externally both longitudinally and transversely so that the inner side of tire casings may be repaired thereon by the vulcanizing process. The smaller contour-mold has ends 59 and 60, the larger one having ends 61 and 62, and one end of the smaller contour-mold has a boss 63 thereon and the opposite end a boss 64, the bosses of the smaller contour mold being connected to the terminal portions 49 and 50 of the hollow brackets, the ends of the larger contour-mold having similar bosses 64' that are connected to the branches 53 and 54 respectively, so that the contour-molds are supported on the steam-pipes or hollow brackets. The under side of each contour-mold has a socket 65 arranged midway between the ends thereof, and each contour-mold is provided with pivots 66 and 67 adjacent to the ends respectively of the contour-mold. Two arms 68 and 69 are connected to the pivots respectively and extend each toward the other beneath the contour-mold, whereby to tighten wrapping tapes to securely hold the tire casing to the contour-mold. The arms are suitably operated and controlled, preferably being suitably connected with a nut 70 screw-threaded on an adjusting screw 71 having a head 72 arranged in the socket 65, the head having a circumferential groove 73 into which extends a retaining pin 74 inserted in the wall of the socket. The steam-boiler is provided with a steam-gage 75 and a safety-valve 76 which preferably are connected with the hollow brackets respectively.

A pair of suitable brackets 77 and 78 are arranged at the opposite end of the steam-boiler and preferably are secured to the end wall 31, the brackets having horizontal arms 79 and 80 respectively to which a hollow flat table 81 is connected and preferably supported by means of the brackets so as to be very firmly supported. A shaft 82 is supported at a suitable distance higher than the table, being preferably secured to the brackets. A suitable number of rock-levers 83, 84, 85 and 86 are loosely mounted between their ends on the shaft so that one end of each is arranged above the flat table, said ends being provided with presser-bars 87, 88, 89 and 90 respectively that extend downward toward the table, a suitable number of filling blocks 91, preferably composed of wood, being provided to be placed between the presser-bar and the rubber tube to be arranged upon the table. Each rock-lever is suitably spring-pressed so as to cause the presser-bar to be forced toward the table, preferably by means of a spring 92 coiled on the shaft 82 and connected therewith and also with the rock-lever. For controlling the rock-levers a suitable number of foot-levers 93, 94, 95 and 96 are provided and connected to the frame of the apparatus, being preferably connected to a single pivotal rod 97 that is connected to the lower portions of two of the legs of the supporting stand. The foot-levers have pull-rods 98, 99, 100 and 101 connected thereto that are connected to the rock-levers respectively, each pull-rod preferably being provided with a turn-buckle 102 for varying the length of the pull-rod. Two steam-conducting pipes 103 and 104 are connected to the wall portion 31 of the steam-chamber of the steam-boiler and are connected also to the hollow table 81 and provided with valves 105 and 106 respectively. In some cases the steam-conducting pipes may suffice to solely support the table 81, in which case the brackets 77 and 78 could be relatively smaller than indicated and need not be connected to the steam-boiler.

For the purpose of utilizing the heat from the gas burners to the maximum extent, the steam-boiler has an inclosing casing comprising side portions 107 and 108 and end portions 109 and 110, the upper portion of the casing being preferably provided with a vent pipe 111. The casing extends from the lateral portions of the steam-boiler downward to a plane below the gas burners, so as to receive the heat escaping from beneath the boiler bottom and also from the flues that distribute the heat to the water in the steam-boiler, the casing conducting the heat to the outer sides of the steam boiler.

In practical use all the gas burners may be used until steam is produced, after which the use of one burner may be sufficient to maintain the required quantity of steam. Damaged portions of tires or casings are vulcanized in the cavities or concave contour-molds in the top of the steam boiler. When it is necessary to repair the inner side of a tire casing the casing is placed over one of the convex contour-molds 57 or 58 with patching rubber arranged in the proper place, after which binding tape is wrapped around the casing and under the arms 68 and 69 which can be forced downward by means of the screws 71 in order to tighten the wrapping and securely hold the casing in place. Inner tubes are repaired upon the table 81 and may be quickly arranged in place by first operating the foot-lever and then placing the inner tube properly upon the table, after which the block 91 is placed upon the tube and automatically forced thereon by means of the presser-bar upon release of the foot-lever. Thus many operations may be performed at one and the same time and the work handled by a number of workmen if urgently needed.

Having thus described the invention, what is claimed as new is—

1. A vulcanizing apparatus including a steam-boiler, two hollow brackets connected to the upper portion of the steam-boiler, a contour-mold connected at its opposite ends to the two hollow brackets, a wrapper-tightening arm pivotally connected with the under portion of the mold to be pivotally moved toward or from the mold, and means for controlling and moving the arm.

2. A vulcanizing apparatus including a steam-boiler, two hollow brackets connected with the upper portion of the steam-boiler, a contour-mold connected to the brackets and provided with a pair of adjustable wrapper-tightening arms, and means for controlling the pair of arms synchronously.

3. A vulcanizing apparatus including a steam-boiler, two hollow brackets secured to the steam-boiler, a plurality of contour-molds connected to the brackets and provided each with a pair of adjustable wrapper-tightening arms, and means for controlling the pair of arms simultaneously.

4. A vulcanizing apparatus including a steam-boiler with concave contour-molds in its top, the steam-boiler having lateral steam-chamber extensions on opposite ends thereof, two steam-conducting brackets connected to the steam-chamber extension on one end of the steam-boiler, a hollow convex contour-mold connected to the brackets, two steam-pipes connected to the steam-chamber extension on the opposite end of the steam-boiler, and a hollow flat table horizontally connected to the steam pipes.

5. A vulcanizing apparatus including a steam-boiler having lateral steam-chamber extensions, a contour-mold having connection with one of the extensions, flues in the steam-boiler extending from the bottom and through a vertical portion of the steam-boiler, a gas-burner below the steam-boiler, and a casing extending about and inclosing the lower portion of the steam-boiler and also inclosing the gas-burner and connected with the bottom of the steam-chamber extensions.

6. A vulcanizing apparatus including a steam-boiler, two steam-pipes connected to the steam-boiler and having each an upward-extending terminal portion, a hollow convex contour-mold having two ends connected to the terminal portions of the steam-pipes respectively, two arms pivotally connected to the under side of the contour-mold and extending each toward the other, and means coöperating with the ends of the arms and the contour-mold to control the arms.

7. A vulcanizing apparatus including a steam-boiler with concave contour-molds in its top, the steam-boiler having a draft-flue therein connected with the bottom and also with a vertical side portion thereof, a gas-burner arranged below said bottom and the inlet end of the draft-flue, a casing extending about and inclosing the steam-boiler, a hollow convex contour-mold having connection with one end of the steam-boiler and provided with a wrapper-tightening arm and a hollow flat table having connection with the opposite end of the steam-boiler and provided with spring-actuated presser-bars.

8. A vulcanizing apparatus including a steam-boiler, two steam-pipes connected to and supported by the steam-boiler, a hollow flat table connected to the steam-pipes, two brackets having connection with the table, a shaft secured to the brackets, a plurality of rock-levers loosely connected between their ends to the shaft and having each a presser-bar on one end thereof and arranged above the table, each rock-lever being provided with a spring to force the presser-bar toward the table, and a plurality of foot-levers pivotally supported below the steam-boiler and having each a pull-rod connected to the opposite end of the rock-lever, one to each rock-lever.

9. A vulcanizing apparatus comprising a stand, a steam-boiler supported upon the stand and having heat-conducting flues therein, a heat-conducting casing extending about and inclosing the steam-boiler and the upper portion of the stand, the top of said casing having connection with the upper portion of the steam-boiler, a gas-burner arranged below the steam-boiler and inclosed by said casing, concave contour-molds in the top of the steam-boiler, two pipes connected to the steam-boiler, a hollow convex contour-mold connected to the two pipes, and a pair of controlled wrapper-tightening arms pivoted to the end portions respectively of the contour-mold.

10. In a vulcanizing apparatus, the combination of a steam-boiler, contour-molds in the top of the steam-boiler, studs secured to the top of the steam-boiler, a number of the studs having each two collars integral thereon, clamp-bars arranged under the respective collars of said studs, and clamp screws arranged in said clamp-bars.

11. In a vulcanizing apparatus, the combination of a unitary steam-boiler and contour-mold, the upper portion of the steam-boiler having lateral steam-chamber extensions on two opposite sides thereof, the top of the steam-boiler having mold-cavities of which two are arranged partially in said extensions respectively, said mold-cavities having bottoms that extend beyond two other opposite sides of said steam-boiler which has steam-chamber extensions under said bottom extensions, a gas-burner arranged under said steam-boiler, and a heat-conducting casing connected with said steam-chamber extensions and extending about and inclosing the main portion of the steam-boiler.

12. In a vulcanizing apparatus, the combination of a stand, a steam-boiler seated upon the stand and having four connected lateral steam-chamber extensions on the upper portion thereof, the top of the steam-boiler having mold depressions that extend over two of said extensions, two of the depressions being over the remaining ones of said extensions respectively, a draft flue in the steam-boiler extending from the bottom upward and also horizontally to a vertical side portion of the steam-boiler, a gas burner arranged under said bottom below the inlet of said draft-flue, and an inclosing heat-conducting casing extending about the stand and the main portion of the steam-boiler at a distance therefrom and up to all of said four steam-chamber extensions, said casing extending about said gas-burner and receiving the heat from the horizontal portion of said draft-flue.

13. In a vulcanizing apparatus, the combination with a stand, and a steam-boiler on the stand, of a pair of brackets secured to the steam-boiler, a plurality of foot-levers pivoted to the stand, a hollow table connected to the brackets, two pipes connected to the steam-boiler and the hollow table, a shaft secured to the two brackets, a plurality of rock-levers loosely connected to the shaft and provided each with a presser-bar arranged above said table, and a plurality of rods connected to said foot-levers respectively and also to said rock-levers respectively.

14. In a vulcanizing apparatus, the combination with a steam-boiler, of a pair of pipes connected with the steam-boiler, a hollow contour-mold connected at its ends to the pipes, the under portion of the mold having two pivots adjacent to the ends thereof and also a socket mid-way between the pivots, two arms connected to the pivots respectively and extending each toward the other, a nut connected with the ends of the arms, an adjusting screw extending through the nut and having a head rotatably arranged in the socket, and means for retaining the said head in said socket.

15. In a vulcanizing apparatus, the combination with a steam-boiler, of two pipes secured to the steam-boiler, a hollow flat table secured to the pipes and provided with two brackets, a shaft secured to the brackets, a plurality of rock-levers loosely connected between their ends to the shaft, presser-bars connected to one end of the rock-levers respectively and thereby carried above the table, a plurality of springs connected to the rock-levers respectively and to the shaft to force the presser-bars toward the table, and a plurality of pull-rods connected to the opposite ends of the rock-levers respectively and provided each with a controlling device.

In testimony whereof I affix my signature in presence of two witnesses.

PHILIP DEUTSCHER.

Witnesses:
  E. T. SILVIUS,
  F. M. ROEDER.